United States Patent
Patel et al.

(10) Patent No.: US 10,630,742 B2
(45) Date of Patent: Apr. 21, 2020

(54) SYSTEM AND METHOD FOR CONTENT MESSAGING

(71) Applicant: Kodiak Networks Inc., Plano, TX (US)

(72) Inventors: Krishnakant M. Patel, Richardson, TX (US); Debabrata Dash, Richardson, TX (US); Ravi Ayyasamy, Richardson, TX (US); Pratap Chandana, Plano, TX (US); Bharat Ram Setti, Plano, TX (US); Sayyad Gaffar, Bengaluru (IN)

(73) Assignee: KODIAK NETWORKS, INC., Plano, TX (US)

( * ) Notice: Subject to any disclaimer, the term of this patent is extended or adjusted under 35 U.S.C. 154(b) by 496 days.

(21) Appl. No.: 15/299,812

(22) Filed: Oct. 21, 2016

(65) Prior Publication Data
US 2017/0118262 A1   Apr. 27, 2017

Related U.S. Application Data

(60) Provisional application No. 62/245,876, filed on Oct. 23, 2015.

(51) Int. Cl.
*H04L 29/06* (2006.01)
*G06F 16/27* (2019.01)
(Continued)

(52) U.S. Cl.
CPC .......... *H04L 65/4061* (2013.01); *G06F 16/27* (2019.01); *G06F 16/285* (2019.01);
(Continued)

(58) Field of Classification Search
CPC . H04L 65/4061; H04L 67/1095; H04L 51/24; H04L 51/04; H04L 51/06;
(Continued)

(56) References Cited

U.S. PATENT DOCUMENTS

| 3,912,874 A | 10/1975 | Botterell et al. |
| 4,796,293 A | 1/1989 | Blinken et al. |

(Continued)

FOREIGN PATENT DOCUMENTS

| GB | 2338150 A | 3/1998 |
| JP | 200392776 A | 10/2004 |

(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.

(Continued)

*Primary Examiner* — David R Lazaro

(57) ABSTRACT

A system and method for content messaging includes observing, by the server, synchronization of a database cluster accessible to the server with a first local database at a first client, the database cluster including a message after the synchronization, the message including content and instructions for processing the content, and processing, by the server, the content of the message according to the instructions for processing the content, in response to observing the synchronization.

22 Claims, 6 Drawing Sheets

(51) Int. Cl.
*G06F 16/28* (2019.01)
*H04L 29/08* (2006.01)
*H04W 4/10* (2009.01)
*H04W 84/04* (2009.01)
*H04L 12/58* (2006.01)
*G06Q 10/10* (2012.01)

(52) U.S. Cl.
CPC .......... *H04L 51/24* (2013.01); *H04L 67/1095* (2013.01); *G06Q 10/10* (2013.01); *H04L 51/04* (2013.01); *H04L 51/06* (2013.01); *H04W 4/10* (2013.01); *H04W 84/042* (2013.01)

(58) Field of Classification Search
CPC ......... H04L 67/26; H04L 51/18; H04L 51/10; H04L 51/16; H04L 51/32; H04L 51/00; G06F 17/30575; G06F 17/30598; H04W 4/10; H04W 84/042; G06Q 10/10
See application file for complete search history.

(56) References Cited

U.S. PATENT DOCUMENTS

| | | | |
|---|---|---|---|
| 5,353,328 | A | 10/1994 | Jokimies |
| 5,442,809 | A | 8/1995 | Diaz et al. |
| 5,546,449 | A | 8/1996 | Hogan et al. |
| 5,711,011 | A | 1/1998 | Urs et al. |
| 5,752,196 | A | 5/1998 | Ahvenainen et al. |
| 5,987,318 | A | 11/1999 | Alperovich et al. |
| 5,987,331 | A | 11/1999 | Grube et al. |
| 6,011,976 | A | 1/2000 | Michaels et al. |
| 6,021,326 | A | 2/2000 | Nguyen |
| 6,138,011 | A | 10/2000 | Sanders, III et al. |
| 6,141,556 | A | 10/2000 | Dougherty et al. |
| 6,192,119 | B1 | 2/2001 | Wilson |
| 6,304,558 | B1 | 10/2001 | Mysore |
| 6,397,054 | B1 | 5/2002 | Hoirup et al. |
| 6,405,030 | B1 | 6/2002 | Suprunov |
| 6,411,815 | B1 | 6/2002 | Balasuriya |
| 6,473,501 | B1 | 10/2002 | Paulsrud |
| 6,477,366 | B1 | 11/2002 | Valentine et al. |
| 6,477,387 | B1 | 11/2002 | Jackson et al. |
| 6,549,773 | B1 | 4/2003 | Linden et al. |
| 6,577,874 | B1 | 6/2003 | Dailey |
| 6,606,305 | B1 | 8/2003 | Boyle et al. |
| 6,628,937 | B1 | 9/2003 | Salin |
| 6,640,242 | B1* | 10/2003 | O'Neal .............. H04L 51/066 370/401 |
| 6,643,669 | B1 | 11/2003 | Novak et al. |
| 6,661,878 | B1 | 12/2003 | Mirashrafi et al. |
| 6,725,053 | B2 | 4/2004 | Rosen et al. |
| 6,751,468 | B1 | 6/2004 | Heubel et al. |
| 6,801,762 | B1 | 10/2004 | Huilgol |
| 6,856,676 | B1 | 2/2005 | Pirot et al. |
| 6,865,398 | B2 | 3/2005 | Mangal et al. |
| 6,892,074 | B2 | 5/2005 | Tarkiainen et al. |
| 6,895,254 | B2 | 5/2005 | Dorenbosch |
| 6,898,436 | B2 | 5/2005 | Crockett et al. |
| 6,934,752 | B1* | 8/2005 | Gubbi .............. H04L 29/06027 370/392 |
| 6,993,355 | B1 | 1/2006 | Pershan |
| 6,996,414 | B2 | 2/2006 | Vishwanathan et al. |
| 7,026,926 | B1 | 4/2006 | Walker, III |
| 7,043,266 | B2 | 6/2006 | Chaturvedi et al. |
| 7,082,316 | B2 | 7/2006 | Elden et al. |
| 7,085,364 | B1 | 8/2006 | Ahmed et al. |
| 7,099,291 | B2 | 8/2006 | Harris et al. |
| 7,123,905 | B1 | 10/2006 | Allaway et al. |
| 7,170,863 | B1 | 1/2007 | Denman et al. |
| 7,231,225 | B2 | 6/2007 | Rao et al. |
| 7,236,580 | B1 | 6/2007 | Sarkar et al. |
| 7,330,540 | B2 | 2/2008 | Darby et al. |
| 7,366,535 | B2 | 4/2008 | Glass et al. |
| 7,403,775 | B2 | 7/2008 | Patel et al. |
| 7,460,861 | B2 | 12/2008 | Zabawskj |
| 7,529,557 | B2 | 5/2009 | Farrill |
| 7,577,687 | B2 | 8/2009 | Bank et al. |
| 7,689,238 | B2 | 3/2010 | Biswas et al. |
| 7,738,861 | B2 | 6/2010 | Fournier |
| 7,738,892 | B2 | 6/2010 | Ayyasamy et al. |
| 7,738,896 | B2 | 6/2010 | Patel et al. |
| 7,751,348 | B2 | 7/2010 | Shaffer et al. |
| 7,764,950 | B2 | 7/2010 | Patel et al. |
| 7,787,896 | B2 | 8/2010 | Kundu et al. |
| 7,788,382 | B1 | 8/2010 | Jones et al. |
| 7,797,010 | B1 | 9/2010 | Manroa et al. |
| 7,813,722 | B2 | 10/2010 | Patel et al. |
| 7,853,279 | B2 | 12/2010 | Patel et al. |
| 8,036,692 | B2 | 10/2011 | Ayyasamy et al. |
| 8,149,113 | B2 | 4/2012 | Diem |
| 8,160,495 | B2* | 4/2012 | Khedouri .............. G06Q 20/206 455/41.2 |
| 8,170,988 | B2 | 5/2012 | Yukawa et al. |
| 8,171,171 | B2 | 5/2012 | Kim et al. |
| 8,244,252 | B2 | 8/2012 | Descombes |
| 8,369,829 | B2 | 2/2013 | Nagubhai et al. |
| 8,478,261 | B2 | 7/2013 | Vempati et al. |
| 8,498,660 | B2 | 7/2013 | Lawler et al. |
| 8,620,858 | B2 | 12/2013 | Backholm et al. |
| 8,670,760 | B2 | 3/2014 | Lawler et al. |
| 8,676,189 | B2 | 3/2014 | Lawler et al. |
| 8,738,710 | B1* | 5/2014 | Du .............. G06F 9/54 709/206 |
| 9,628,950 | B1* | 4/2017 | Noeth ............... H04M 1/72552 |
| 9,973,891 | B2* | 5/2018 | Patel .................... H04W 4/021 |
| 2001/0005372 | A1 | 6/2001 | Cave et al. |
| 2002/0009990 | A1 | 1/2002 | Kleier et al. |
| 2002/0024943 | A1 | 2/2002 | Karaul et al. |
| 2002/0077136 | A1 | 6/2002 | Maggenti et al. |
| 2002/0086659 | A1 | 7/2002 | Lauper |
| 2002/0086676 | A1 | 7/2002 | Hendrey et al. |
| 2002/0102989 | A1 | 8/2002 | Calvert et al. |
| 2002/0187750 | A1 | 12/2002 | Majumdar |
| 2002/0196781 | A1 | 12/2002 | Salovuori |
| 2003/0009463 | A1 | 1/2003 | Gallant |
| 2003/0016632 | A1 | 1/2003 | Refai et al. |
| 2003/0017836 | A1 | 1/2003 | Vishwanathan et al. |
| 2003/0078064 | A1 | 4/2003 | Chan |
| 2003/0119540 | A1 | 6/2003 | Mathis |
| 2003/0148779 | A1 | 8/2003 | Aravamudan et al. |
| 2003/0149774 | A1 | 8/2003 | McConnell et al. |
| 2003/0153343 | A1 | 8/2003 | Crockett et al. |
| 2003/0190888 | A1 | 10/2003 | Mangal et al. |
| 2004/0032843 | A1 | 2/2004 | Schaefer et al. |
| 2004/0057449 | A1 | 3/2004 | Black |
| 2004/0067751 | A1 | 4/2004 | Vandermeijden et al. |
| 2004/0095954 | A1 | 5/2004 | Varney et al. |
| 2004/0121760 | A1 | 6/2004 | Wetman et al. |
| 2004/0127233 | A1 | 7/2004 | Harris et al. |
| 2004/0152441 | A1 | 8/2004 | Wong |
| 2004/0176100 | A1 | 9/2004 | Florkey et al. |
| 2004/0179531 | A1 | 9/2004 | Bi et al. |
| 2004/0196826 | A1 | 10/2004 | Bao et al. |
| 2004/0203793 | A1 | 10/2004 | Dorenbosch |
| 2004/0219941 | A1 | 11/2004 | Haaramo et al. |
| 2004/0224710 | A1 | 11/2004 | Koskelainen et al. |
| 2004/0228292 | A1 | 11/2004 | Edwards |
| 2004/0259580 | A1 | 12/2004 | Florkey et al. |
| 2005/0047362 | A1 | 3/2005 | Harris et al. |
| 2005/0101308 | A1 | 5/2005 | Lee |
| 2005/0111430 | A1 | 5/2005 | Spear et al. |
| 2005/0119012 | A1 | 6/2005 | Merheb et al. |
| 2005/0143135 | A1 | 6/2005 | Brems et al. |
| 2005/0164737 | A1 | 7/2005 | Brown |
| 2005/0189337 | A1 | 9/2005 | Baune |
| 2005/0192041 | A1 | 9/2005 | Oxley et al. |
| 2005/0202807 | A1 | 9/2005 | Ayyasamy et al. |
| 2005/0221819 | A1 | 10/2005 | Patel et al. |
| 2005/0232241 | A1 | 10/2005 | Wu et al. |
| 2005/0239485 | A1 | 10/2005 | Kundu et al. |
| 2005/0254464 | A1 | 11/2005 | Patel et al. |
| 2005/0261016 | A1 | 11/2005 | Patel et al. |
| 2006/0003740 | A1 | 1/2006 | Munje |
| 2006/0003751 | A1 | 1/2006 | Vo |

(56) References Cited

U.S. PATENT DOCUMENTS

| | | |
|---|---|---|
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0171338 A1* | 8/2006 | Lim ................. H04W 4/10 370/278 |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2006/0293066 A1 | 12/2006 | Edge et al. |
| 2007/0026871 A1 | 2/2007 | Wager |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0082690 A1* | 4/2007 | Fabien ............. H04W 72/005 455/518 |
| 2007/0099609 A1 | 5/2007 | Cai |
| 2007/0133757 A1 | 6/2007 | Girouard et al. |
| 2007/0150444 A1* | 6/2007 | Chesnais ............. H04W 4/02 |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0005294 A1* | 1/2008 | Morris ............. G06Q 10/107 709/223 |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0147799 A1* | 6/2008 | Morris ............. H04L 51/18 709/206 |
| 2008/0299953 A1 | 12/2008 | Rao |
| 2009/0030917 A1 | 1/2009 | Guo et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0182824 A1* | 7/2009 | Haynes ............. H04L 51/16 709/206 |
| 2009/0191896 A1 | 7/2009 | Ge |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0149388 A1 | 6/2012 | West et al. |
| 2013/0117406 A1 | 5/2013 | Chevillat et al. |
| 2013/0155875 A1 | 6/2013 | Ayyasamy et al. |
| 2013/0157699 A1* | 6/2013 | Talwar ............. H04L 51/38 455/466 |
| 2013/0194999 A1 | 8/2013 | Anchan |
| 2013/0196706 A1 | 8/2013 | Patel et al. |
| 2013/0337859 A1 | 12/2013 | Patel et al. |
| 2014/0148210 A1 | 5/2014 | Kundu et al. |
| 2014/0378167 A1 | 12/2014 | Haney |
| 2016/0029224 A1 | 1/2016 | Edge |
| 2016/0149839 A1* | 5/2016 | Yi ............. H04L 67/1095 709/206 |
| 2016/0164816 A1* | 6/2016 | Bhagwan ............. H04L 51/18 709/206 |
| 2016/0315888 A1* | 10/2016 | Uraizee ............. H04L 51/08 |
| 2017/0118262 A1* | 4/2017 | Patel ............. H04L 65/4061 |
| 2017/0118592 A1* | 4/2017 | Patel ............. H04W 4/021 |
| 2018/0013714 A1* | 1/2018 | Leach ............. G06F 16/27 |
| 2018/0198745 A1* | 7/2018 | Talwar ............. H04W 4/14 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 2003073292 A1 | 9/2003 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

\* cited by examiner

SYSTEM AND METHOD FOR CONTENT MESSAGING

CROSS-REFERENCE TO RELATED APPLICATIONS

This application claims the benefit of U.S. Provisional Application No. 62/245,876, filed on Oct. 23, 2015, which application is hereby incorporated herein by reference.

TECHNICAL FIELD

The present invention relates generally to communications over a network, and, in particular embodiments, to a system and method for content messaging.

BACKGROUND

Push-to-X (PTX) over cellular (PoC) platforms provide content delivery functionality (e.g., audio/video multimedia content, location data, etc.) through clients on client devices. Push-to-X is a broad field that may include multiple technologies for content delivery involving communications systems with functions that may be performed by one or more servers, and communications between the client devices and the servers may be performed over a network (e.g., a carrier network, Wi-Fi, etc.). However, as content types and sizes have evolved, new challenges are being discovered with the messaging protocols used to exchange content.

SUMMARY

In accordance with a preferred embodiment of the present invention, a method for content delivery includes: observing, by the server, synchronization of a database cluster accessible to the server with a first local database at a first client, the database cluster including a message after the synchronization, the message including content and instructions for processing the content; and processing, by the server, the content of the message according to the instructions for processing the content, in response to observing the synchronization.

In some embodiments, the method further includes detecting, by the server, availability of the message in the database cluster after the synchronization of the message. In some embodiments, synchronization of the message is triggered by an event at the first client causing the first client to create or update the content of the message. In some embodiments, processing the content of the message comprises invoking, by the server, one or more services at the server according to the instructions for processing the content. In some embodiments, processing the content of the message further comprises sending, by the server, one or more notifications to one or more second clients according to an expected result of the one or more services, the one or more notifications not including the message. In some embodiments, the method further includes observing, by the one or more second clients, synchronization of the message from the database cluster into second local databases at the one or more second clients. In some embodiments, the method further includes observing, by the server, synchronization of a delivery receipt for the message from the second local database into the database cluster; and notifying, by the server, the first client that the delivery receipt for the message is available for synchronization from the database cluster into the first local database, in response to observing the synchronization of the delivery receipt. In some embodiments, the content of the message comprises a metadata document and an attachment content document, and the observing the synchronization of the database cluster includes: observing, by the server, the synchronization of the metadata document from the first local database into the database cluster; after the observing the synchronization of the metadata document, processing the metadata document; and observing, by the server, synchronization of the attachment content document from the first local database into the database cluster. In some embodiments, the method further includes: observing, by a second client, synchronization of the metadata document from the database cluster into a second local database at a second client; receiving, by the server, a request for the attachment content document from the second client; and observing, by the second client, synchronization of the attachment content document from the database cluster into the second local database, in response to receiving the request for the attachment content document. In some embodiments, the metadata document is synchronized over a first connection, and the attachment content document is synchronized over a second connection. In some embodiments, the first connection and the second connection are different connections. In some embodiments, the first connection and the second connection are the same connection. In some embodiments, the content includes text, an image, a video, location information, a file or a combination thereof.

In accordance with a preferred embodiment of the present invention, server for content delivery includes: a processor; and a computer readable storage medium storing programming for execution by the processor, the programming including instructions for: observing synchronization of a database cluster accessible to the server with a first local database at a first client, the database cluster including a message after the synchronization, the message including content and instructions for processing the content; and processing the content of the message according to the instructions for processing the content, in response to observing the synchronization.

In some embodiments, the programming further includes instructions for detecting availability of the message in the database cluster after the synchronization of the message. In some embodiments, the synchronization of the message is triggered by an event at the first client causing the first client to create or update the content of the message. In some embodiments, the instructions for processing the content of the message includes instructions for invoking one or more services at the server according to the instructions for processing the content. In some embodiments, the instructions for processing the content of the message further includes instructions for sending, by the server, one or more notifications to one or more second clients according to an expected result of the one or more services, the one or more notifications not including the message. In some embodiments, the instructions for processing the content of the message further includes instructions for observing synchronization of the message from the database cluster into second local databases at the one or more second clients. In some embodiments, the programming further includes instructions for: observing synchronization of a delivery receipt for the message from the second local database into the database cluster; and notifying the first client that the delivery receipt for the message is available for synchronization from the database cluster into the first local database, in response to observing the synchronization of the delivery receipt. In some embodiments, the content of the message comprises a metadata document and an attachment content document, and wherein the instructions for observing synchronization of the database cluster includes instructions for: observing synchronization of the metadata document from the first local database into the database cluster; after the observing the synchronization of the metadata document, processing the metadata document; and observing synchronization of the attachment content document from the first local database into the database cluster. In some embodiments, the programming further includes instructions for: observing synchronization of the metadata document from the database cluster into a second local database at a second client; receiving, by the server, a request for the attachment content document from the second client; and observing synchronization of the attachment content document from the database cluster into the second local database, in response to receiving the request for the attachment content document. In some embodiments, the metadata document is synchronized over a first connection, and the attachment content document is synchronized over a second connection. In some embodiments, the first connection and the second connection are different connections. In some embodiments, the first connection and the second connection are the same connection. In some embodiments, the content includes text, an image, a video, location information, a file or a combination thereof.

In accordance with a preferred embodiment of the present invention a method for content delivery includes: creating, by the client, a message, the message including content and instructions for processing the content; storing, by the client, the message in a first local database at the client; and synchronizing, by the client, the first local database at the client with a database cluster at a server, the database cluster including the message after the synchronizing.

In some embodiments, the synchronizing the message is triggered by an event at the client causing first client to create or update the content of the message. In some embodiments, the creating the message comprises splitting the message into a metadata document and an attachment content document.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
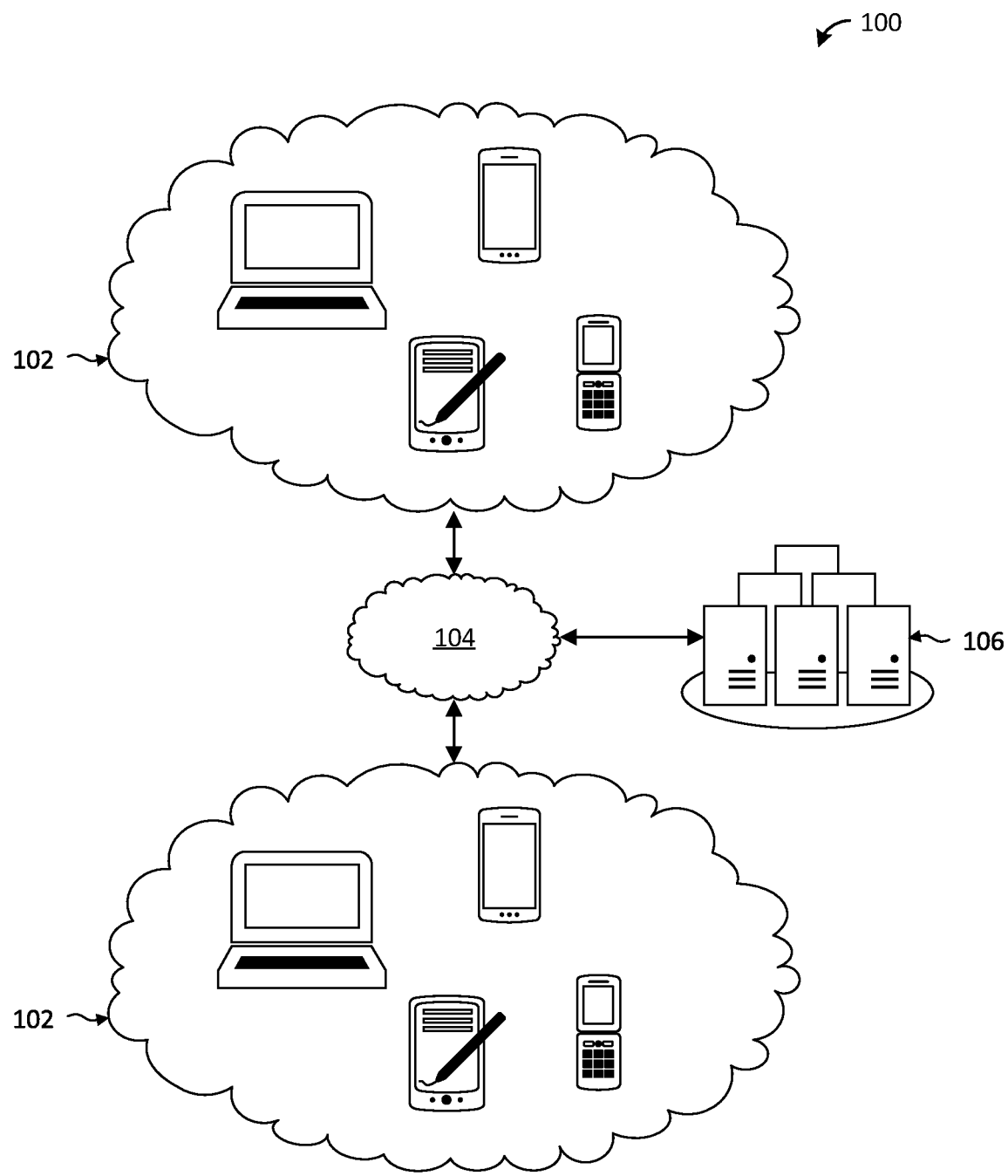
FIG. 1 is a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A system and method for content messaging is provided according to various embodiments. In particular, mobile data synchronization is used to facilitate content messaging in a content delivery network. Data synchronization is used to transfer message contents, instead of traditional back-and-forth messaging over Hypertext Transfer Protocol (HTTP) or other protocols. The synchronized data may be unstructured or schemaless data. Embodiment mobile data synchronization techniques provide a robust, responsive, and highly available mechanism for content messaging that ensures consistency of data. PoC subscribers and dispatchers may use embodiment content messaging techniques to perform instant messaging, location, and multimedia-content sharing with other PoC subscribers in a PTX communication system. PTX communication may include one-to-one communication, and one-to-many group communications (using pre-defined groups or dynamic groups). Supported messaging functionality may include reply, reply-to-all, and message forwarding. Further, embodiments may support a store-and-forward mechanism, whereby messages may be stored and later delivered to offline subscribers when the offline subscribers become available. Messaging of different types of content may be supported. For example, PTX subscribers may send text messages and/or various multimedia messages such as audio, video, etc. Alternatively, PTX subscribers may send their location to one another, or to the PTX platform, allowing features such as location sharing and geofencing to be integrated with PTX.

Mobile data synchronization for content delivery is performed in real time, and is based on long polling or comet-type technology in an online state. Once a PTX client is connected, the connection is reused for multiple content deliveries/data synchronizations. Use of long polling may avoid the use of multiple requests/responses for content delivery negotiations, which may be required by stateless connections such as HTTP. Avoiding multiple requests/responses reduces the signaling overhead required to keep content in sync. As a result, sending and receiving messages with mobile data synchronization over a long polling technology may achieve a reduction of signaling overhead, thereby optimizing or at least improving RAN utilization.

Embodiments may achieve advantages. Mobile data synchronization allows user messages to be sent and received irrespective of network availability, ensuring more reliable message delivery. Distributed synchronization may be platform-agnostic, allowing more client devices to support PTX. As noted above, sending and receiving messages with mobile data synchronization may achieve a reduction of signaling overhead, thereby optimizing or at least improving radio access network (RAN) utilization. Mobile data synchronization may overcome limits of service-based approaches, and help unify mobile/web PTX solutions.

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as PTX functions, provided by the telecommunications solution.

The client devices 102 may communicate with the telecommunications services platform 106 over the communications network 104, which may be accessed by the client devices 102 through a cellular network deployed by a carrier, a WiFi network, a RAN, other wireless networks, a wired internet protocol (IP) network, combinations thereof, or the like. The communications network 104 may include one or more components configured to provide wireless or wired network access, such as an enhanced Node B (eNB), a macro-cell, a femtocell, a Wi-Fi access point (AP), combinations thereof, or the like. Furthermore, the communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, the communications network 104 may comprise various other devices, such as relays, low power nodes, etc. The communications network 104 may further include backhaul network components, such as various gateways, routers, controllers, schedulers, and the like.

In an embodiment where the telecommunications services platform 106 is a PoC platform, subscribers to a PTT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, the telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, the telecommunications services platform 106 incorporates distributed databases, clustering technologies, data analytics tools, and messaging middleware to provide a robust, scalable platform. The telecommunications services platform 106 may use fully virtualized components with a layered approach to service orchestration, which allows the telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Figure 2:
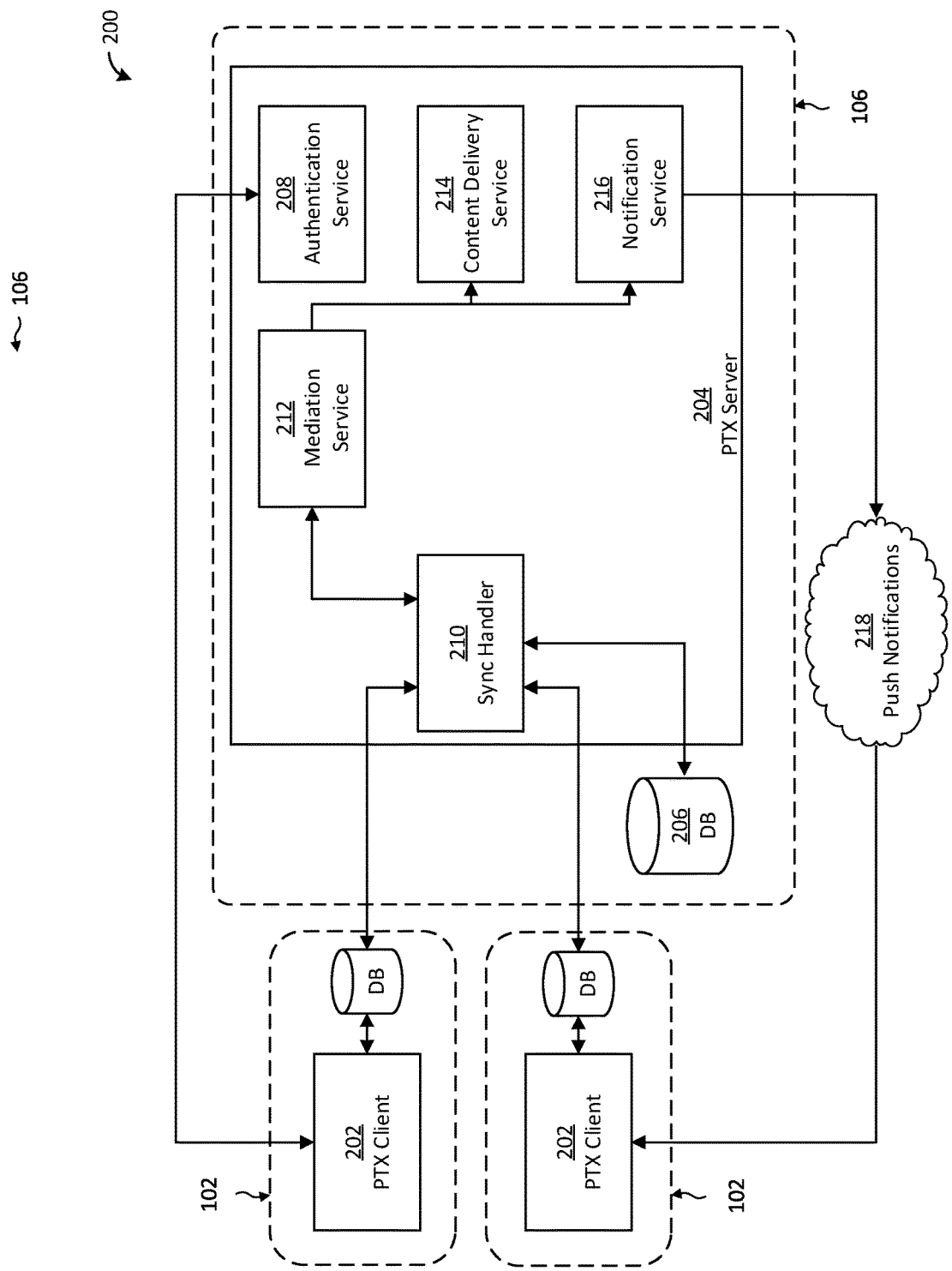
FIG. 2 is a block diagram of components in the communications system that form a content delivery system.

FIG. 2 is a block diagram of components in the communications system 100 that form a content delivery system 200. The client devices 102 run a PTX client 202, which may be a hardware or a software client. The telecommunications services platform 106 runs a PTX server 204, which may be software, and a database (DB) cluster 206. The content delivery system 200 supports content messaging between the PTX clients 202.

The PTX server 204 includes an authentication service 208, synchronization handlers 210, a mediation server 212, content delivery services 214, and a notification service 216. The various services and handlers of the PTX server 204 provide a platform based on unstructured data synchronization that is utilized to enhance data routing orchestration services for a PTX platform. The PTX clients 202 access a mobile data store or local database (DB) at the client devices 102, and data synchronization is used for data orchestration between the PTX clients 202 and the PTX server 204, thereby managing network dependence and reducing cruft code during development. The data and data storage may be unstructured or schemaless, which may allow new features to be developed and deployed in the content delivery system 200 without affecting current frameworks, and may coexist with current frameworks, thereby reducing the time to market for new features and enhancements. Data synchronization may be used instead of messaging protocols such as XML Configuration Access Protocol (XCAP) or XQuery and XPath Data Model (XDM), avoiding the limitations of such protocols and simplifying implementations on both the PTX client 202 and the PTX server 204. Because the local DB is always available to the PTX client 202, the PTX client 202 may read, write, and query data in the local DB even when not connected to the PTX server 204.

The PTX client 202 stores content (such as messages) in the local DB, which is synchronized to the DB cluster 206 at the PTX server 204. The PTX client 202 uses the local DB for a basic message content store, using database operations such as create, read, update and delete (CRUD) operations at the client layer. Content synchronization is offloaded to a loosely connected DB layer, which performs synchronization via the synchronization handlers 210. The data synchronization may include copying records from the local DB to the DB cluster 206; merging data in the local DB and the DB cluster 206; resolving synchronization conflicts; and updating and/or deleting records in the local DB and/or the DB cluster 206. Performing synchronization at the DB layer may reduce the amount of networking implemented in the PTX client 202. The PTX server 204 supports change notifications via webhooks, which can trigger native methods of listening for or observing changes. This triggering is based on data-change events and event processing using event routers, such as the mediation server 212 (discussed below). Event-based processing facilitates asynchronous processing of content messages based on data availability.

The PTX clients 202 and/or the PTX server 204 observe the changes in the data stored in the DB cluster 206 caused by synchronization. Observation may be performed by receiving an event notification that the PTX clients 202 and/or the PTX server 204 respond to.

Although the illustrated embodiments are presented in the context of delivering PTX features such as multimedia or location data, it should be appreciated that a wide variety of services may be delivered using embodiment content messaging techniques.

The DB cluster 206 may be a structured or an unstructured data store. In an embodiment, the DB cluster 206 is a NoSQL database, although any data storage could be used. Data for the content delivery system 200 is stored in the DB cluster 206. In some embodiments, the DB cluster 206 is single cluster (or multiple clusters of DBs), and all of the local DBs may replicate their copy of data, which is a subset of the dataset in the single cluster. In some embodiments, the DB cluster 206 includes several separate databases (or separate clusters of databases), and the various local DBs may replicate all of the data in one of the separate databases.

The authentication service 208 provides authentication functions, and authenticates the PTX clients 202 when they connect to the PTX server 204. The authentication service 208 check user credentials against data in the DB cluster 206. If authentication succeeds, the PTX clients 202 are permitted to access the PTX server 204.

The synchronization handlers 210 provide seamless and secure data synchronization between the local DB on the PTX clients 202 and the DB cluster 206. The synchronization handlers 210 manage the delivery of content to/from the PTX clients 202 and the DB cluster 206 via an abstracted data management layer. The synchronization handlers 210 may synchronize all of the data in the DB cluster 206 with the PTX clients 202, or may synchronize a subset of the data in the DB cluster 206. For example, the synchronization handlers 210 may support fine-grained, filter-based data synchronization and delivery to the PTX clients 202. The synchronization handlers 210 may synchronize the PTX clients 202 and the DB cluster 206 on-demand, or may do so on a basis that is managed by the PTX server 204. In some embodiments, data synchronization may be event based. Although shown as part of the PTX server 204, it should be appreciated that the synchronization handlers 210 may be part of another system. For example, the synchronization handlers 210 may be part of the DB cluster 206.

There may be more than one of the synchronization handlers 210. For example, there may be different synchronization handlers 210 for each major mobile platform supported. As such, the PTX server 204 may have mobile cross-platform support, and cross platform mobile development may be accomplished with a common code base.

The synchronization handlers 210 may communicate with the PTX clients 202 through a load balancer (not shown), such as a reverse proxy. Communication with the PTX clients 202 may be over a secure transport, e.g., transport layer security (TLS), secure sockets layer (SSL), etc. The PTX clients 202 may support secure local storage, and may encrypt the local DB.

The mediation server 212 interacts with the synchronization handlers 210, and performs application level functionality when data is synchronized between the PTX clients 202 and the DB cluster 206. In some embodiments, the mediation server 212 is notified by the synchronization handlers 210 of data changes via a webhook upon successful synchronization. Upon a data change, the mediation server 212 may act as an application broker, and may dispatch one or more of the content delivery services 214.

The content delivery services 214 perform functions such as PTX messaging, message notifications, and the like. There may be one or more of the content delivery services 214 for each function performed. Examples of functions include PTT location services, presence services, PTX messaging services, and the like.

In some embodiments, the content delivery services 214 support content messaging. For example, when a sending PTX client sends a message, the message is received by the PTX server 204 during a data synchronization. After successful synchronization, the PTX messaging service is dispatched by the mediation service 212 to deliver the message to the recipient, such as a recipient PTX client. The messaging service adds the message to the inbox of the recipient PTX client in the DB cluster 108, and then dispatches a notification to the recipient PTX client so that the recipient PTX client is invoked to fetch the message through data synchronization.

In some embodiments, the content delivery services 214 support location services such as geofencing. For example, multiple PTX clients may send their location to the PTX server 204 via data synchronization. The PTT location service is dispatched by the mediation service 212 to apply geofencing rules to the received locations, make changes to the PTX call according to the applied rules, and notify the PTX clients of changes by updating the DB cluster 108. The PTX clients may then fetch the changes through data synchronization.

The notification service 216 is dispatched by some of the content delivery services 214 based on application logic. For example, after successfully routing a message, the PTX messaging service may invoke the notification service 216 to deliver a notification to the recipient PTX client. The notification triggers the recipient PTX client, causing it to fetch the new message in response to receiving the notification. In some embodiments, the notification service 216 may use a push notification provider 218 to deliver notifications. For example, in embodiments where the PTX client 202 is an Apple device, the push notification provider 218 may be Apple Push Notification Service (APNS) that is used to notify the PTX client 202. Likewise, the push notification provider 218 may be Google Cloud Messaging (GCM) in embodiments where the PTX client 202 is an Android device.

Figure 3A:
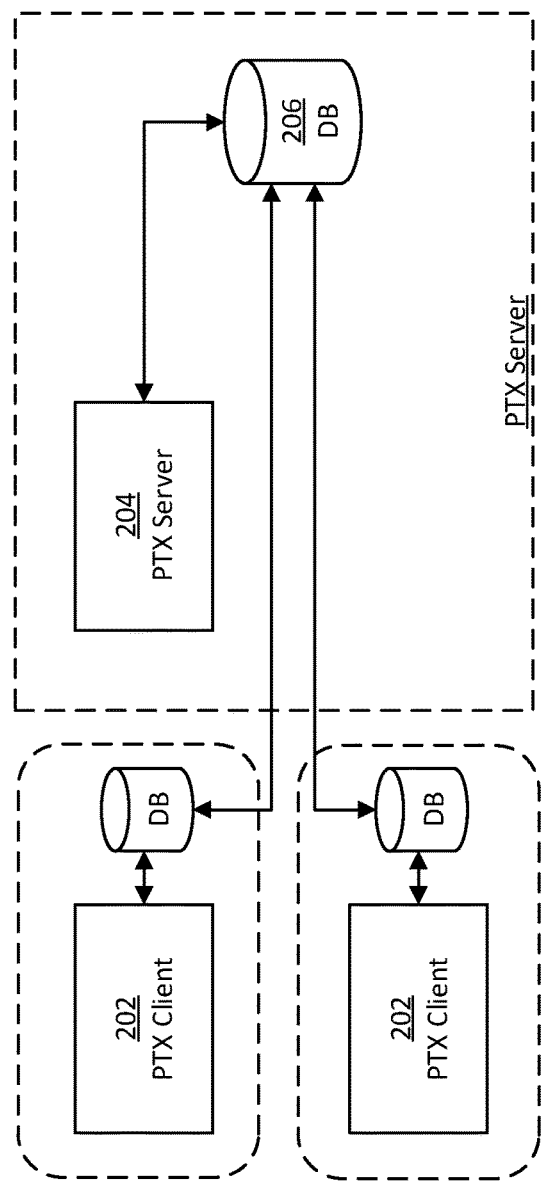
FIGS. 3A and 3B show data synchronization schemes.
Figure 3B:
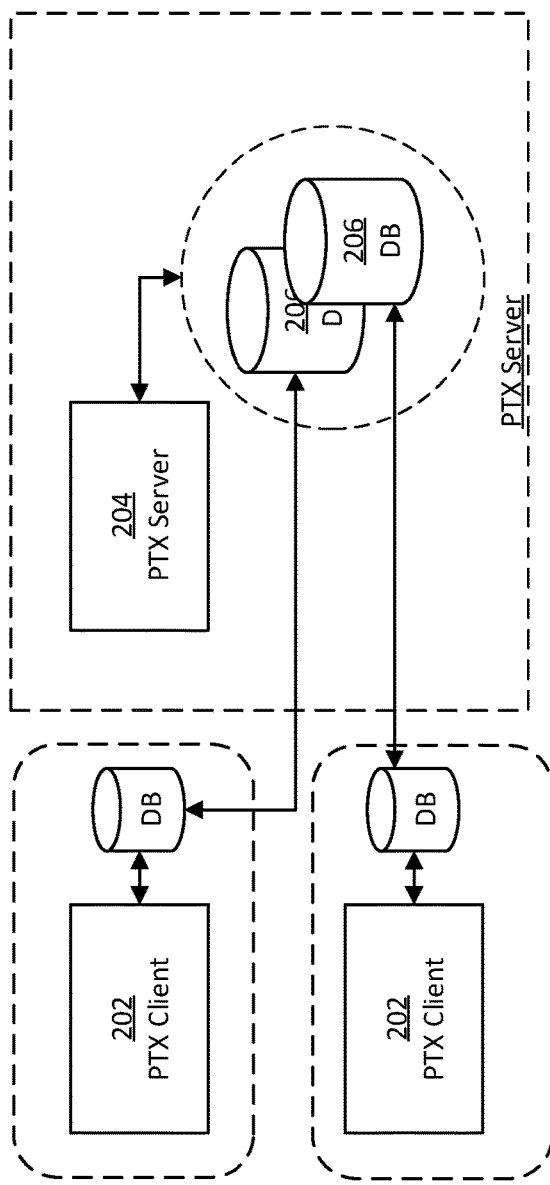

FIGS. 3A and 3B show data synchronization schemes. FIG. 3A shows an embodiment where the DB cluster 206 is single cluster. Each of the PTX clients 202 replicate a subset of the data from the single database into their local DBs and stay synchronized. FIG. 3B shows an embodiment where the DB cluster 206 includes several separate databases (or separate clusters of databases). Each of the PTX clients 202 replicate all of the data from one of the separate databases into their local DBs and stay synchronized.

Figure 4:
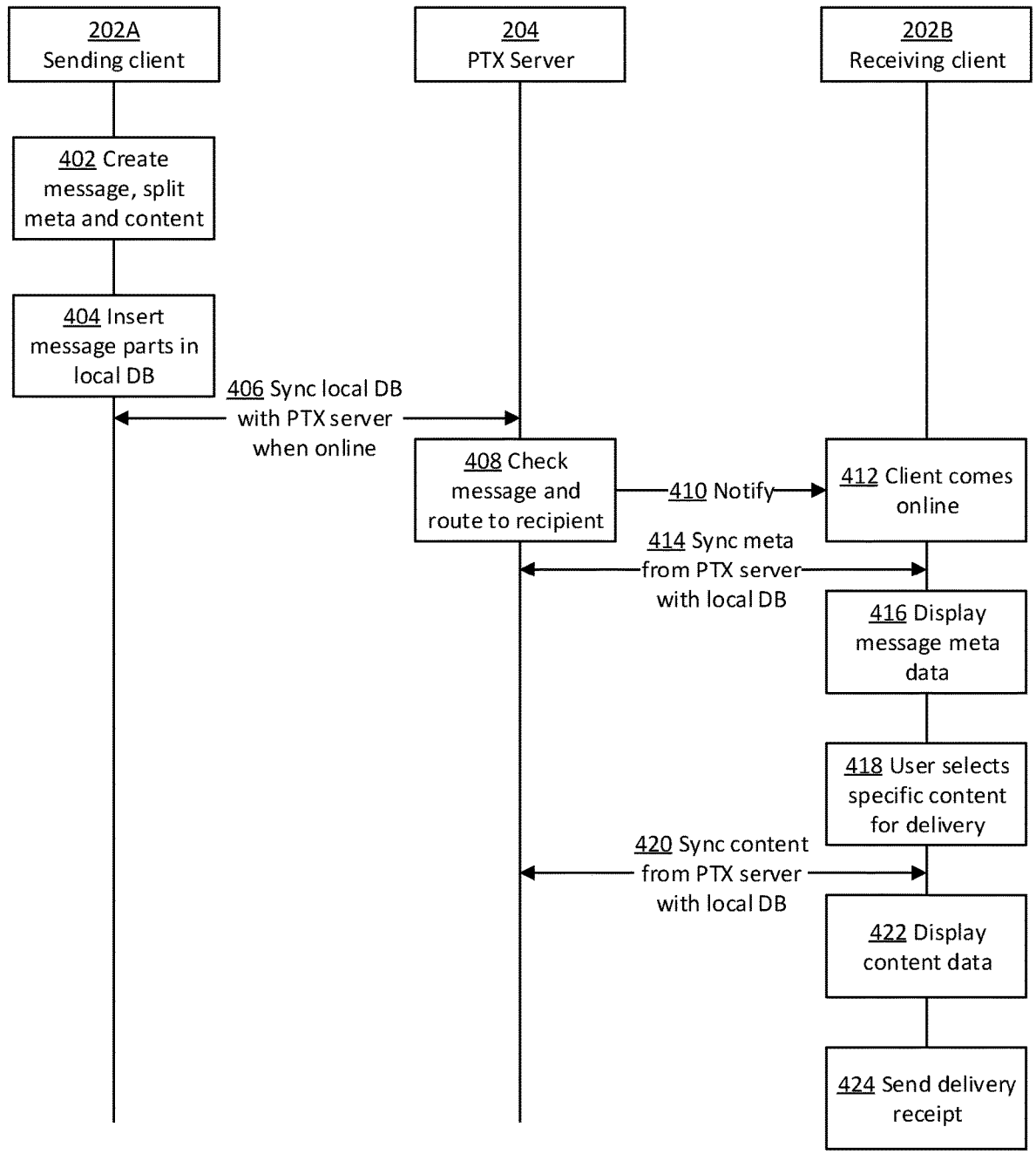
FIG. 4 is a protocol diagram of a content messaging method.

FIG. 4 is a protocol diagram of a content messaging method 400, which may be performed by various components in the content delivery system 200. The content messaging method 400 may be used for sending PTX messages with a variety of payloads, such as text messages, location messages, multimedia messages, and the like. The messages may be sent among the PTX clients 202, which may include a sending PTX client 202A and a receiving PTX client 202B.

The sending PTX client 202A creates the message (step 402). The message is split into a metadata document and an attachment document. The metadata document includes metadata attributes for the message, such as the sender, recipient, time and date, and the like. If the message has a text and/or location payload, then the metadata document includes the payload. If the message is a multimedia message, such as a picture, video, voice recording, or the like, then the metadata document includes the message attributes, and the attachment document includes the message payload. The attachment document may have a pre-defined multipurpose internet mail extensions (MIME) type identifying the content type of the attachment document.

The message document(s) stored in the local DB may be unstructured data. Further, the local DB may hold multiple different types of documents. For example, the text and/or location documents may have different format than the attachment documents, and may all be stored in the same storage space of the local DB.

The sending PTX client 202A stores the prepared message document(s) in its local DB (step 404). The metadata document and the attachment document are both stored in the local DB. Storing the message in the local DB queues it to be sent. At the time of storage, the sending PTX client 202A may not be able to access the network. Because the message is stored in the local DB, it may be queued for delivery when the sending PTX client 202A reconnects to the network.

The sending PTX client 202A synchronizes its local DB with the PTX server 204 (step 406). The synchronization may be performed as soon as the message is stored, or may be performed when the network is available, e.g., when the PTX client 202A is online. After synchronization, some or all the message is stored in the DB cluster 206 on the PTX server 204. In some embodiments, the entirety of each message is stored in the DB cluster 206. In some embodiments, text documents, location documents, and metadata documents are stored in the DB cluster 206, and attachment documents are stored in cloud storage. The cloud storage may be provided by a network or service operator, or may be provided by a cloud computing provider such as Amazon's Advanced Web Services, Microsoft's Azure, etc.

Each message stored in the DB cluster 206 has a time to live (TTL). Before expiry of a message's TTL, the message documents are archived to an archive DB (not shown). The archive DB may have a TTL that is different than message documents stored on the archive DB.

The PTX server 204 checks the message and routes it to the recipient (step 408). Checking the message includes checking the metadata document. The message check (or validation) may be triggered using a webhook after the synchronization handlers 210 complete synchronization of the local DB with the DB cluster 206. Validation may include determining the recipient exists in the content delivery system, supports content messaging capabilities, and is registered to receive notifications via the push notification provider 218. If the recipient is not valid, then the message document(s) are marked as non-deliverable and synchronized back to the sending PTX client 202A. The message document(s) are routed to the receiving PTX client 202B by storing the message document(s) in a portion of the DB cluster 206 available to the receiving PTX client 202B.

The PTX server 204 notifies the receiving PTX client 202B that the new message is available in response to the recipient being valid (step 410). The notification is dispatched by the notification service 216 and delivered by the push notification provider 218. At the time of notification, the message document(s) may not be delivered to the receiving PTX client 202B. For example, if the PTX client application is not processing in the foreground of the client device, then only a notification is sent, and the message document(s) are stored for later delivery. In other words, the PTX server 204 may act as a store-and-forward system for content delivery.

The receiving PTX client 202B comes online (step 412). Coming online may occur when the PTT client application comes to foreground processing on the client device, when the user opens a particular screen, etc. For some PTX clients 202, reception of the notification may bring the PTT client application to the foreground. The metadata document is then delivered to the receiving PTX client 202B by synchronizing the DB cluster 206 with the client's local DB in a first synchronization operation (step 414). The metadata document will be forwarded to the receiving PTX client 202B when the DBs are synchronized. In embodiments where the message includes a metadata document and an attachment document, only the metadata document may be synchronized to the local DB.

The message metadata document is displayed to the user (step 416). For example, a text portion of the message stored in the metadata document may be displayed by the receiving PTX client 202B. The user may then select specific content of the message for viewing (step 418). For example, the user may open the attachment document of the message. The attachment document is then delivered to the receiving PTX client 202B by synchronizing the DB cluster 206 with the client's local DB in a second synchronization operation (step 420). In some embodiments, the second synchronization operation may use an existing connection that was used in the first synchronization operation.

In some embodiments, the PTX clients 202 may use two data routes for synchronization: a first for metadata document synchronization, and a second for attachment document synchronization. In such embodiments, a connection for the first channel may be reused for each metadata document synchronization, and a connection for the second channel may be reused for each attachment document synchronization.

The attachment document is displayed to the user (step 422). The receiving PTX client 202B stores a delivery receipt document in the local DB when the message is successfully displayed (step 424). The delivery receipt document is synchronized back to the PTX server 204, and is then synchronized to the sending PTX client 202A, effectively notifying the sender that the message was successfully received.

Some embodiments may support group messaging. Group messaging may be performed in a client-server manner, or a peer-to-peer manner. In embodiments where group messaging is performed in a client-server manner, group messages may be delivered in a manner similar to the content messaging method 400. In such embodiments, the new message notification may be delivered to all PTX clients in the group. The PTX server 204 identifies members of the group, and manages data synchronization with all group members.

Figure 5:
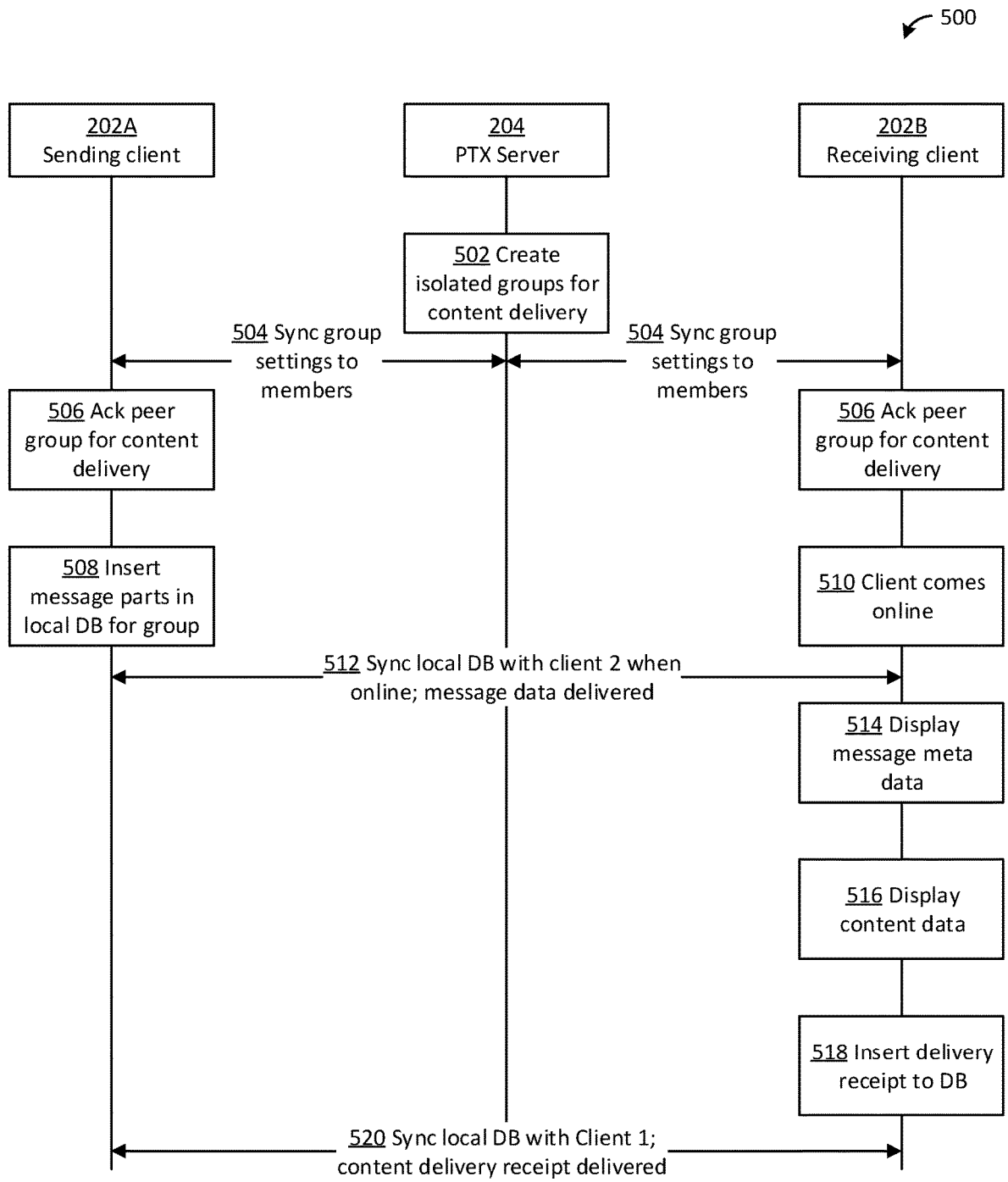
FIG. 5 is a protocol diagram of a group messaging method.

FIG. 5 is a protocol diagram of a group messaging method 500. The group messaging method 500 is used in embodiments where group messaging is performed in a peer-to-peer manner.

The PTX server 204 creates an isolated group for content delivery (step 502). The isolated group includes multiple PTX clients 202, which may include a sending PTX client 202A and a receiving PTX client 202B. The settings for the isolated group are then sent to the PTX clients 202 of the group through data synchronization (step 504). The settings may be sent as documents inserted in the DB cluster 206 and synchronized to the local DBs at the PTX clients. The sending PTX client 202A and the receiving PTX client 202B each send an acknowledgment to peers in the isolated group for content delivery (step 506).

The sending PTX client 202A stores a message for the group in the local DB at the sending PTX client 202A (step 508). The message includes a metadata document and any attachment documents for a message, which are split before being stored, as discussed above in step 402. Storing the message in the local DB queues it for delivery to the isolated group.

The receiving PTX client 202B comes online (step 510). After coming online, the message is delivered to the receiving PTX client 202B by synchronizing the local DB at the sending PTX client 202A with the local DB at the receiving PTX client 202B (step 512). The synchronization may occur in a peer-to-peer manner.

The message metadata document is displayed to the user (step 514). The user may then select specific content of the message for viewing, and the attachment document is displayed to the user (step 516). The receiving PTX client 202B stores a delivery receipt document in the local DB when the message is successfully displayed (step 518). The delivery receipt is delivered to the sending PTX client 202A by synchronizing the local DB at the receiving PTX client 202B with the local DB at the sending PTX client 202A (step 512). The synchronization may occur in a peer-to-peer manner.

Figure 6:
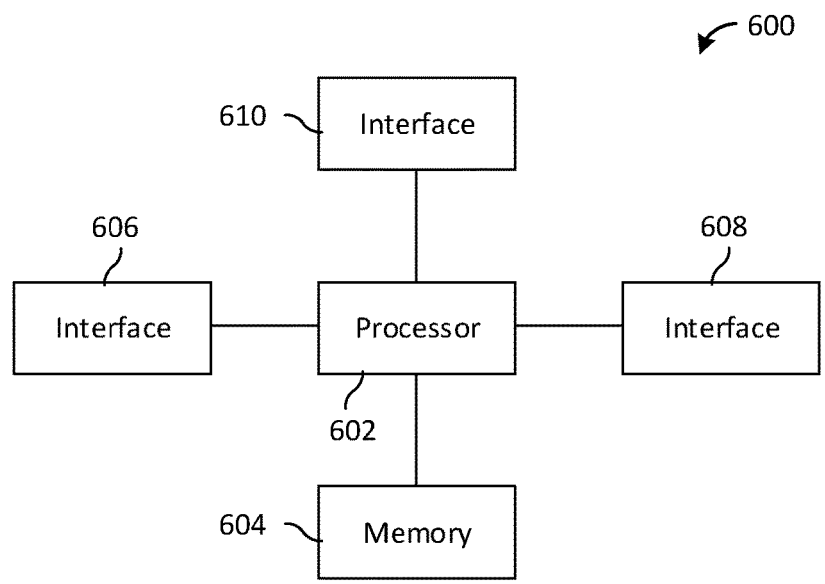
FIG. 6 is a block diagram of a processing system.

FIG. 6 is a block diagram of a processing system 600 for performing methods described herein, which may be installed in a host device. As shown, the processing system 600 includes a processor 602, a memory 604, and interfaces 606-610, which may (or may not) be arranged as shown in FIG. 6. The processor 602 may be any component or collection of components adapted to perform computations and/or other processing related tasks, and the memory 604 may be any component or collection of components adapted to store programming and/or instructions for execution by the processor 602. In an embodiment, the memory 604 includes a non-transitory computer readable medium. The interfaces 606, 608, 610 may be any component or collection of components that allow the processing system 600 to communicate with other devices/components and/or a user. For example, one or more of the interfaces 606, 608, 610 may be adapted to communicate data, control, or management messages from the processor 602 to applications installed on the host device and/or a remote device. As another example, one or more of the interfaces 606, 608, 610 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
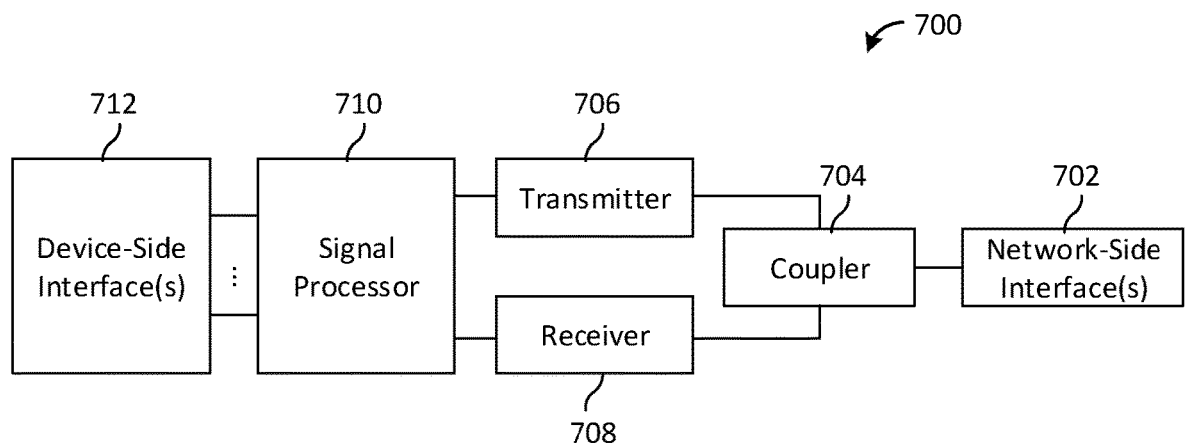
FIG. 7 is a block diagram of a transceiver.

In some embodiments, one or more of the interfaces 606, 608, 610 connects the processing system 600 to a transceiver adapted to transmit and receive signaling over the telecommunications network. FIG. 7 is a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, by a server, for content delivery, the method comprising:
    observing, by the server, synchronization of a database cluster accessible to the server with a first local database at a first client, the database cluster including a message after the synchronization, the message including content and instructions for processing the content; and processing, by the server, the content of the message according to the instructions for processing the content, in response to observing the synchronization, wherein processing the content of the message comprises:
  invoking, by the server, one or more services at the server according to the instructions for processing the content; and
  sending, by the server, one or more notifications to one or more second clients according to an expected result of the one or more services, the one or more notifications not including the message.

2. The method of claim 1, further comprising:
detecting, by the server, availability of the message in the database cluster after the synchronization of the message.

3. The method of claim 1, wherein the synchronization of the message is triggered by an event at the first client causing the first client to create or update the content of the message.

4. The method of claim 1, further comprising:
observing, by the one or more second clients, synchronization of the message from the database cluster into second local databases at the one or more second clients.

5. The method of claim 4, further comprising:
observing, by the server, synchronization of a delivery receipt for the message from the second local database into the database cluster; and
notifying, by the server, the first client that the delivery receipt for the message is available for synchronization from the database cluster into the first local database, in response to observing the synchronization of the delivery receipt.

6. The method of claim 1, wherein the content of the message comprises a metadata document and an attachment content document, and wherein the observing the synchronization of the database cluster comprises:
  observing, by the server, the synchronization of the metadata document from the first local database into the database cluster;
  after the observing the synchronization of the metadata document, processing the metadata document; and
  observing, by the server, synchronization of the attachment content document from the first local database into the database cluster.

7. The method of claim 6, further comprising:
  observing, by a second client, synchronization of the metadata document from the database cluster into a second local database at a second client;
  receiving, by the server, a request for the attachment content document from the second client; and
  observing, by the second client, synchronization of the attachment content document from the database cluster into the second local database, in response to receiving the request for the attachment content document.

8. The method of claim 6, wherein the metadata document is synchronized over a first connection, and the attachment content document is synchronized over a second connection.

9. The method of claim 8, wherein the first connection and the second connection are different connections.

10. The method of claim 8, wherein the first connection and the second connection are the same connection.

11. The method of claim 1, wherein the content includes text, an image, a video, location information, a file or a combination thereof.

12. server for content delivery, the server comprising:
a processor; and
a non-transitory computer readable storage medium storing programming for execution by the processor, the programming including instructions for:
  observing synchronization of a database cluster accessible to the server with a first local database at a first client, the database cluster including a message after the synchronization, the message including content and instructions for processing the content; and
  processing the content of the message according to the instructions for processing the content, in response to observing the synchronization, wherein the instructions for processing the content of the message includes instructions for:
    invoking one or more services at the server according to the instructions for processing the content; and
    sending, by the server, one or more notifications to one or more second clients according to an expected result of the one or more services, the one or more notifications not including the message.

13. The server of claim 12, wherein the programming further includes instructions for:
detecting availability of the message in the database cluster after the synchronization of the message.

14. The server of claim 12, wherein the synchronization of the message is triggered by an event at the first client causing the first client to create or update the content of the message.

15. The server of claim 12, wherein the instructions for processing the content of the message further includes instructions for:
  observing synchronization of the message from the database cluster into second local databases at the one or more second clients.

16. The server of claim 15, wherein the programming further includes instructions for:
  observing synchronization of a delivery receipt for the message from the second local database into the database cluster; and
  notifying the first client that the delivery receipt for the message is available for synchronization from the database cluster into the first local database, in response to observing the synchronization of the delivery receipt.

17. The server of claim 12, wherein the content of the message comprises a metadata document and an attachment content document, and wherein the instructions for observing synchronization of the database cluster includes instructions for:
  observing synchronization of the metadata document from the first local database into the database cluster;
  after the observing the synchronization of the metadata document, processing the metadata document; and
  observing synchronization of the attachment content document from the first local database into the database cluster.

18. The server of claim 17, wherein the programming further includes instructions for:
  observing synchronization of the metadata document from the database cluster into a second local database at a second client;
  receiving, by the server, a request for the attachment content document from the second client; and
  observing synchronization of the attachment content document from the database cluster into the second local database, in response to receiving the request for the attachment content document.

19. The server of claim 17, wherein the metadata document is synchronized over a first connection, and the attachment content document is synchronized over a second connection.

20. The server of claim 19, wherein the first connection and the second connection are different connections.

21. The server of claim 19, wherein the first connection and the second connection are the same connection.

22. The server of claim 12, wherein the content includes text, an image, a video, location information, a file or a combination thereof.

* * * * *